United States Patent
Miller et al.

(10) Patent No.: US 6,452,099 B1
(45) Date of Patent: Sep. 17, 2002

(54) ELECTRIC SIGNAL PASS THROUGH ARRANGEMENT

(75) Inventors: Gary Wayne Miller, Livonia; Thomas Dean Barker, Novi; Garth James Schultz, Oxford, all of MI (US); Stephen Alan Carter, Mississauga (CA)

(73) Assignee: Dynetek Industries Ltd., Calgary (CA)

( * ) Notice: Subject to any disclaimer, the term of this patent is extended or adjusted under 35 U.S.C. 154(b) by 0 days.

(21) Appl. No.: 09/779,722

(22) Filed: Feb. 8, 2001

(51) Int. Cl.⁷ ................................. H02G 3/18
(52) U.S. Cl. .................. 174/65 G; 174/65 R; 16/2.2; 248/56
(58) Field of Search .................. 174/65 G, 65 R, 174/65 SS, 151, 152 G, 153 G, 135; 16/2.1, 2.2; 248/56; 439/604, 274

(56) References Cited

U.S. PATENT DOCUMENTS

| | | | |
|---|---|---|---|
| 2,294,432 A | 9/1942 | Weidner | |
| 2,987,570 A | 6/1961 | Bluth | |
| 3,019,882 A | 2/1962 | Maltby | |
| 3,059,210 A | 10/1962 | Luenberger | |
| 3,084,210 A | 4/1963 | Bluth et al. | |
| 3,352,963 A | 11/1967 | Homrig | |
| 3,386,072 A | 5/1968 | Chandler | |
| 3,520,989 A | 7/1970 | Funk et al. | |
| 4,386,817 A | * 6/1983 | Benker et al. ............ 174/65 G |
| 4,414,427 A | * 11/1983 | Slater et al. .............. 174/65 R |
| 4,458,108 A | 7/1984 | Kashimoto et al. | |
| 4,599,487 A | 7/1986 | Blank et al. | |
| 4,967,577 A | 11/1990 | Gartner et al. | |
| 5,193,580 A | 3/1993 | Wass et al. | |
| 5,197,710 A | 3/1993 | Wass et al. | |
| 5,341,844 A | 8/1994 | Wass et al. | |
| 5,403,976 A | * 4/1995 | Maurice ................... 248/56 X |
| 5,452,738 A | 9/1995 | Borland et al. | |
| 5,458,151 A | 10/1995 | Wass | |
| 5,500,490 A | * 3/1996 | Moyers et al. ............ 174/65 R |
| 5,562,117 A | 10/1996 | Borland et al. | |
| 6,150,607 A | * 11/2000 | Weyl et al. ............... 174/65 G |
| 6,232,554 B1 | * 5/2001 | Yamazaki et al. ...... 174/65 SS |

* cited by examiner

Primary Examiner—Dean A. Reichard
Assistant Examiner—Dhiru R. Patel
(74) Attorney, Agent, or Firm—Sean W. Goodwin

(57) ABSTRACT

An arrangement is provided for passing an electrical signal between a first area having a first pressure, and a second area having a second pressure, wherein the first pressure is normally greater than the second pressure. The arrangement includes a body disposable between the first and second areas. The body has a first surface disposable adjacent the first area, and an aperture extending from the first surface. A sleeve is non-threadingly engaged with the body and defines a passage. The sleeve further has a first portion disposed adjacent the first surface, and a second portion disposed in the aperture. The arrangement further includes an electrically conductive element disposed at least partially in the passage. When the sleeve is exposed to the first pressure, the first portion is urged toward the first surface of the body.

25 Claims, 2 Drawing Sheets

ELECTRIC SIGNAL PASS THROUGH ARRANGEMENT

BACKGROUND OF THE INVENTION

1. Field of the Invention

The invention relates to an arrangement for permitting the transmission of an electrical signal between areas of different pressure.

2. Background Art

A need arises in many applications for transmitting an electrical signal between areas of different pressure. In a tank that contains a fluid under pressure, for example, it is often necessary to conduct such a signal into the tank to control a solenoid-operated valve disposed inside the tank. Because the tank must be breached in order to pass a wire through to the valve, some provision must be made for maintaining a seal so as to prevent leakage of contents out of the tank, or to prevent contaminants from passing into the tank.

Various structures are known for establishing such a seal. U.S. Pat. No. 3,352,963, for instance, discloses a fitting including a high pressure side conductor rod and a low pressure side conductor rod that are joined together by a connector, which is received in an insulating sleeve. The sleeve and the connector are disposed within a pair of nested metal sleeves having complementary tapered sealing surfaces and seats. A hollow loading nut houses the sleeves and connector, and draws them together into sealing relation when the nut is threadably secured to a vessel wall. While this fitting is adequate for transmitting an electrical signal between areas of different pressure, the fitting is complex, bulky and costly to produce.

SUMMARY OF THE INVENTION

The invention addresses the shortcomings of the prior art by providing an arrangement for passing an electrical signal between areas of different pressure that is simple, compact and inexpensive.

Under the invention, an arrangement is provided for passing an electrical signal between a first area having a first pressure, and a second area having a second pressure, wherein the first pressure is normally greater than the second pressure. The arrangement includes a body disposable between the first and second areas. The body has a first surface disposable adjacent the first area, and an aperture extending from the first surface. A sleeve is non-threadingly engaged with the body and defines a passage. The sleeve further has a first portion disposed adjacent the first surface, and a second portion disposed in the aperture. The arrangement further includes an electrically conductive element disposed at least partially in the passage. When the sleeve is exposed to the first pressure, the first portion is urged toward the first surface of the body.

The arrangement further preferably comprises a first conductive member in electrical communication with the conductive element and adapted to extend into the first area, and a second conductive member in electrical communication with the conductive element and adapted to extend into the second area.

The passage of the sleeve may include a main channel and a first conductive element channel extending from the main channel. With such a configuration, the conductive element is disposed at least partially in the first conductive element channel.

The arrangement may also include a second conductive element channel extending from the main channel, and an additional conductive element disposed at least partially in the second conductive element channel. preferably, but not necessarily, the first and second conductive element channels are canted with respect to a sleeve axis of the sleeve. With such a configuration, the size of the sleeve can be minimized, while still providing sufficient space for other components installed in the sleeve.

The conductive element may be a terminal having a radially extending projection and first and second shank sections extending from the projection. The arrangement may also include an insulator disposed between the terminal and the sleeve. While the insulator may have any suitable configuration, the insulator preferably has a main portion and first and second annular portions extending from the main portion. The first annular portion extends between the projection and the sleeve, and the main portion and the second annular portion extend between the second shank section and the sleeve.

Under another embodiment of the invention, an arrangement for passing an electrical signal between first and second areas includes a body disposable between the first and second areas and having an aperture. A sleeve is disposed at least partially in the aperture. The sleeve includes a sleeve axis, a main channel and first and second terminal channels extending from the main channel and canted with respect to the sleeve axis. A first terminal is disposed at least partially in the first terminal channel, and a second terminal is disposed at least partially in the second terminal channel.

These and other objects, features and advantages of the invention are readily apparent from the following detailed description of the best modes for carrying out the invention, when taken in conjunction with the accompanying drawings.

DETAILED DESCRIPTION OF THE PREFERRED EMBODIMENT(S)

Figure 1:
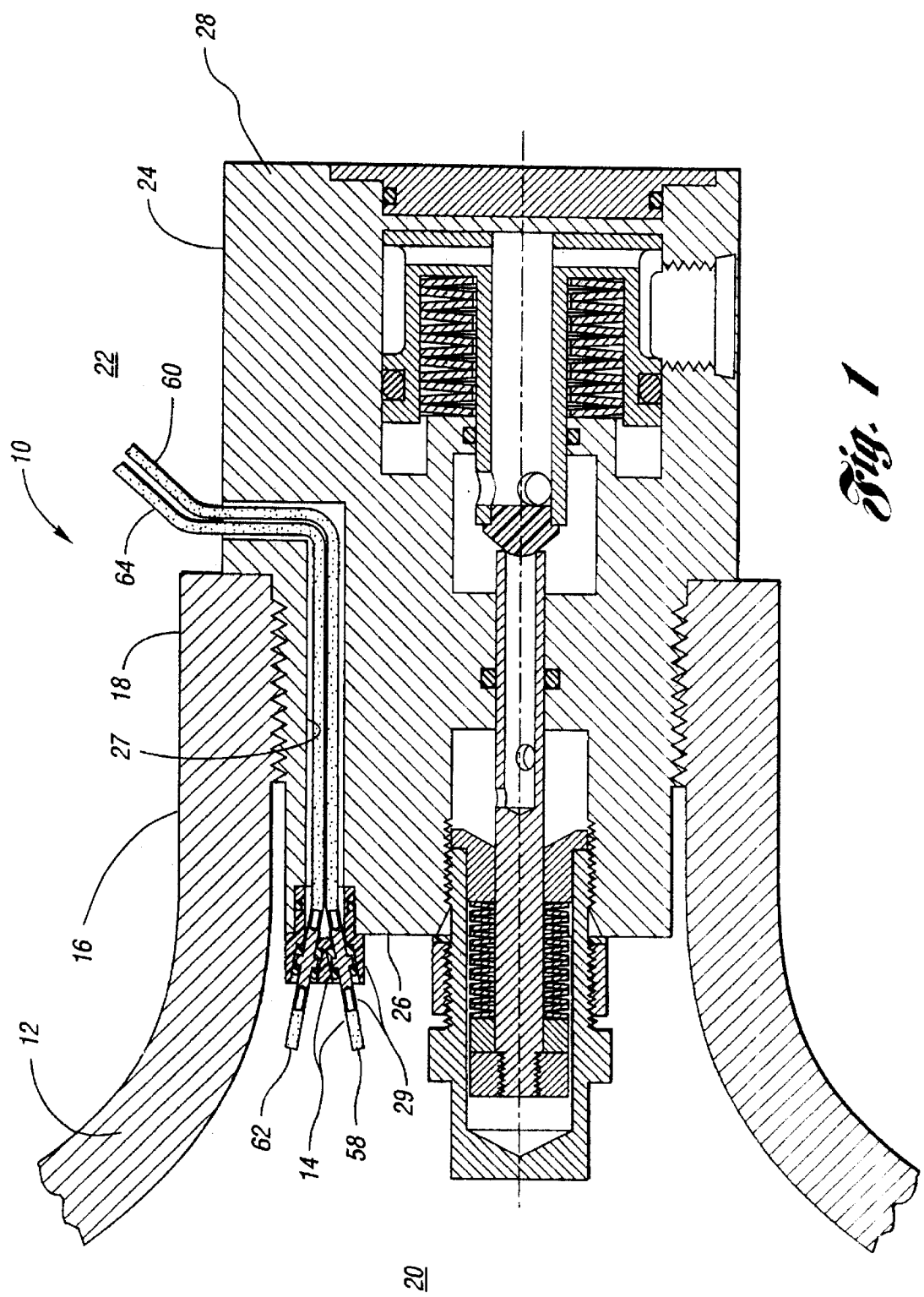
FIG. 1 the invention addresses the shortcomings of the prior art by providing an arrangement for passing an electrical signal between areas of different pressure that is simple, compact and inexpensive.
Figure 2:
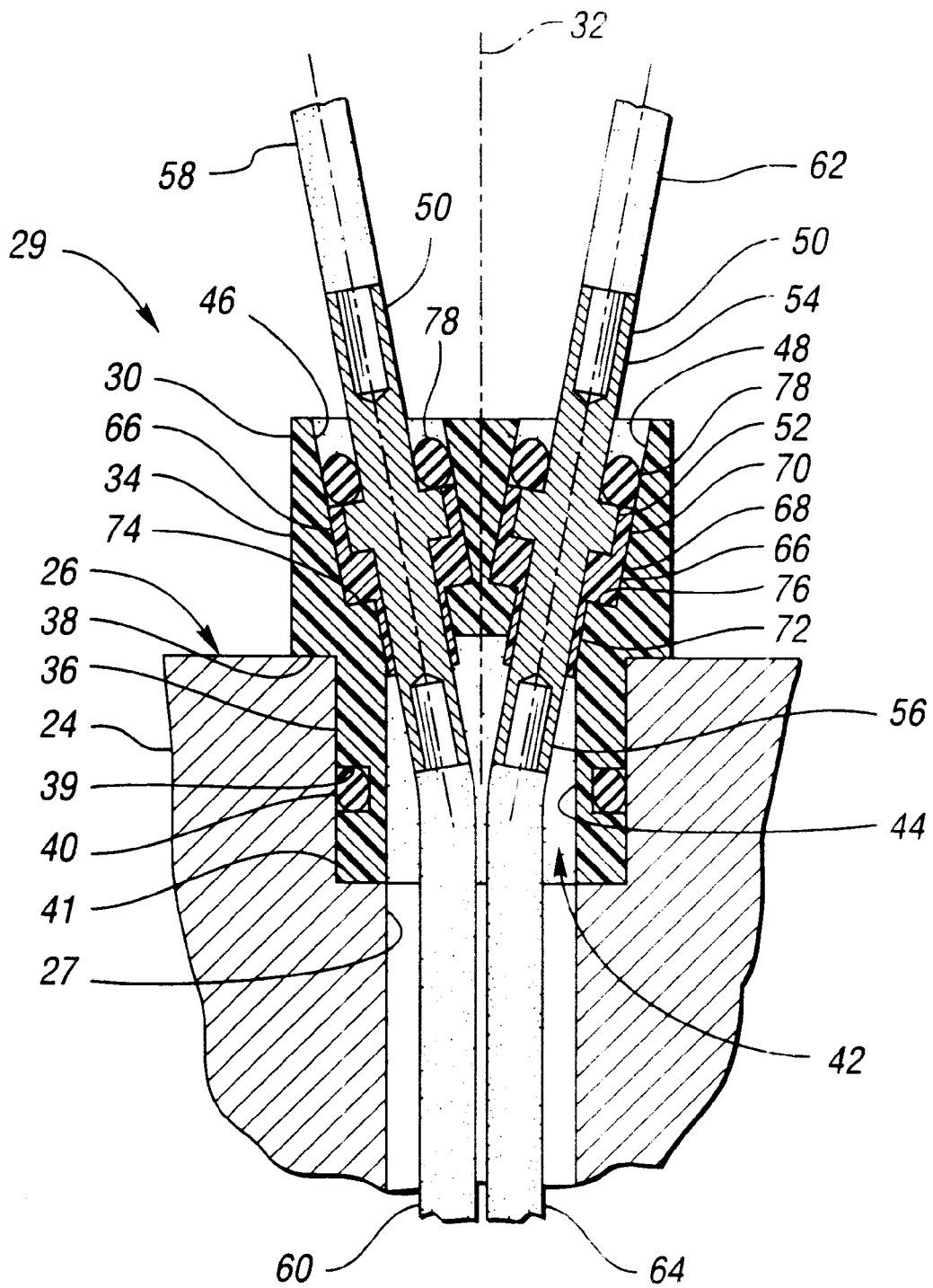
FIG. 2 is an enlarged view of a portion of the system shown in FIG. 1.

FIGS. 1 and 2 show a system 10 according to the invention for permitting the transmission of an electrical signal between areas of different pressure. The system 10 includes a vessel such as a tank 12, and an electrical signal pass through arrangement 14 engaged with the tank 12. In a preferred embodiment, the arrangement 14 may be used to transmit an electrical signal to or from a device (not shown) that is contained in the tank 12. For example, the device may be a solenoid-operated valve, a fluid pressure sensor, a fuel temperature sensor, a tank-stress monitor, etc.

The tank 12 preferably houses a pressurized fluid, such as compressed natural gas (CNG), hydrogen, or oxygen, and includes a housing 16 having a neck 18. The housing 16 may comprise any suitable material such as steel, aluminum and/or fiberglass-reinforced plastic. Furthermore, the housing 16 defines a first area or inner side 20 having a first pressure, and a second area or outer side 22 having a second pressure. The second pressure is typically at or about atmospheric pressure, while the first pressure on the inner side 20 is normally much greater. In a preferred embodiment, where the tank 12 contains CNG, the first pressure on the inner side 20 may be in the range of 3,000–5,000 pounds per square inch or greater. As a result, a pressure differential exists between the first and second sides 20 and 22, respectively.

The arrangement 14 includes a first body 24 threadingly engaged with the neck 18 of the tank 12. Alternatively, the first body 24 may be disposed in any suitable aperture in the tank 12. The first body 24 has a first body surface 26 disposed adjacent the inner side 20, and a first aperture such as first passage 27 extending from the inner side 20 to the outer side 22.

As shown in FIG. 1, the first body 24 is a pressure regulator body of a pressure regulator 28, which regulates outlet pressure of the fluid contained in tank 12. Alternatively, the first body 24 may be any suitable body such as a valve body, end cap, etc.

The arrangement 14 further includes an electric signal pass through assembly 29 disposed at least partially in the first passage 27. As shown in FIG. 2, the assembly 29 includes a second body such as a sleeve 30 non-threadingly engaged with the first body 24. While the sleeve 30 may comprise any suitable material, the sleeve 30 preferably comprises steel, aluminum, or plastic, such as fiber-reinforced plastic.

Preferably, the sleeve 30 is urged into engagement with the first body 24 by the pressure differential that exists between the inner and outer sides 20 and 22, respectively. In other words, the pressure differential functions to apply a retaining force on the sleeve 30 in the direction of the outer side 22, so as to retain the sleeve 30 against and/or within the first body 24. It should also be noted that, depending on the degree of the pressure differential as well as the construction and relative position of the sleeve 30, the pressure differential may or may not actually cause movement of the sleeve 30.

The sleeve 30 has a sleeve axis 32, a first portion 34 engaged with the first surface 26, and a second portion 36 disposed in the first passage 27. Preferably, the portions 34 and 36 are generally cylindrical and cooperate to define a first shoulder 38 that seats against the first surface 26. The second portion 36 also has a circumferential gland or groove 39 that receives a first seal, such as an O-ring 40. Preferably, the O-ring 40 forms an interference fit with the first passage 27 when the second portion 36 is inserted into the first passage 27. Alternatively or supplementally, the second portion 36 may be provided with a width or diameter that is sufficiently large so as to form an interference fit with the first passage 27. Furthermore, the second portion 36 also preferably engages a second shoulder 41 of the first passage 27, so as to inhibit movement of the sleeve 30 with respect to the first body 24. The sleeve 30 also preferably has sufficient strength so that the sleeve 30 will not creep or otherwise move beyond the second shoulder 41 when the sleeve 30 is exposed to the pressure differential.

The sleeve 30 further has a second passage 42 that includes a main channel or bore 44, and a first terminal channel or bore 46 extending from the main bore 44. In the embodiment shown in FIGS. 1 and 2, the sleeve 30 also preferably includes a second terminal channel or bore 48 extending from the main bore 44. Furthermore, the terminal bores 46 and 48 are preferably canted with respect to the sleeve axis 32 so as to provide space for additional components of the assembly 29, as explained below in greater detail. If required for a particular application, the sleeve 30 may also be provided with one or more additional terminal channels or bores that extend from the main bore 44. If, on the other hand, the sleeve 30 is only provided with the first terminal bore 46, then the first terminal bore 46 is preferably coaxially aligned with the sleeve axis 32.

An electrically conductive, pass-through element, such as a terminal 50, is disposed in each terminal bore 46 and 48. Each terminal 50 has a radially extending projection or flange portion 52, and first and second axially extending portions, such as first and second shank sections 54 and 56, respectively, extending from the flange portion 52. While the terminals 50 may comprise any suitable conductive material, each terminal 50 preferably comprises copper.

The assembly 29 further includes a plurality of electrically conductive members, such as wires, connected to the terminals 50. In the embodiment shown in FIGS. 1 and 2, for example, a first wire 58 is connected to the first shank section 54 of one terminal 50, and extends into the inner side 20; a second wire 60 is connected to the second shank section 56 of the one terminal 50, and extends into the outer side 22; a third wire 62 is connected to the first shank section 54 of the other terminal 50, and extends into the inner side 20; and a fourth wire 64 is connected to the second shank section 56 of the other terminal 50, and extends into the outer side 22. While the wires 58–64 may be connected to the terminals 50 in any suitable manner, each wire 58–64 is preferably inserted into an appropriately sized cavity in a particular shank section 54 or 56. The wires 58–64 are then retained in the cavities by crimping the shank sections 54 and 56, or by soldering together the wires 58–64 and the shank sections 54 and 56.

In the embodiment shown in FIGS. 1 and 2, the assembly 29 also includes two insulators 66 for electrically isolating the terminals 50 from the sleeve 30. Each insulator 66 includes a main portion 68 and first and second annular portions 70 and 72, respectively, extending from the main portion 68. The main portion 68 of one insulator 66 seats against a third shoulder 74 of the first terminal bore 46, while the main portion 68 of the other insulator 66 seats against a fourth shoulder 76 of the second terminal bore 48. As shown in FIG. 2, each first annular portion 70 extends between a particular flange portion 52 and the sleeve 30, each main portion 68 extends between a particular second shank section 56 and the sleeve 30, and each second annular portion 72 also extends between a particular second shank section 56 and the sleeve 30. With such a configuration, each terminal 50 can be isolated from the sleeve 30 with a single insulator 66. The insulators 66 may also function to retain the terminals 50 within the terminal bores 46 and 48. While the insulators 66 may comprise any suitable electrically non-conductive material, each insulator 66 preferably comprises plastic having a sufficient strength to withstand the first pressure exerted by the fluid contained in the tank 12.

A second seal, such as a second O-ring 78, is preferably disposed in each terminal bore 46 and 48, so as to seal the terminal bores 46 and 48. The O-rings 78 may also function to further retain the terminals 50 within the terminal bores 46 and 48. The O-rings 78 may be eliminated, however, if, for example, the insulators 66 are configured to sufficiently seal the terminal bores 46 and 48.

To assemble the system 10, the insulators 66 are first positioned around the terminals 50. The wires 58–64 are then connected to the terminals 50, such as described above in detail. Next, the second and fourth wires 60 and 64, respectively, are inserted through the first and second terminal bores 46 and 48, respectively, and into the first passage 27 until the insulators 66 are seated on the shoulders 74 and 76 of the terminal bores 46 and 48. Preferably, the insulators 66 create an interference fit with the sleeve 30 and with the terminals 50, so as to retain the terminals 50 within the sleeve 30. The O-rings 78 are then inserted into the terminal bores 46 and 48 to further retain the terminals 50 within the sleeve 30, and to seal the terminal bores 46 and 48.

Next, the O-ring 40 is positioned in the groove 39 of the sleeve 30, and the sleeve 30 is inserted into the first passage 27 until the first shoulder 38 engages the body surface 26 and/or until the second portion 36 engages the second shoulder 41. With such a configuration, each of the body surface 26 and the second shoulder 41 may be considered an engaging portion of the first body 24. As mentioned above, the O-ring 40 and/or the sleeve 30 preferably create an interference fit with the first body 24 so as to retain the second portion 36 of the sleeve 30 within the first passage 28. Alternatively, the sleeve 30 may be inserted into the first passage 27 prior to installing other components of the assembly 29 in the sleeve 30.

Next, the first and third wires 58 and 62, respectively, may be connected to any suitable device disposed in the tank 12. The first body 24 is then threadingly engaged with the tank 12. Next, the second and fourth wires 60 and 64, respectively, may be connected to any suitable device outside the tank 12, such as a power source (not shown). The tank 12 is then pressurized such as by filling the tank with a compressed fluid.

Because of the interference fit between the various components described above, the second portion 36 of the sleeve 30 is sufficiently retained in the first passage 27, and the terminals 50 are sufficiently retained in the sleeve 30, as the first body 24 is engaged with the tank 12. Advantageously, when the tank 12 is pressurized, the pressure differential created between the inner and outer sides 20 and 22, respectively, urges the sleeve 30 into engagement with the first body 24, thereby further retaining the second portion 36 in the first passage 27. As a result, the sleeve 30 can be provided without threads or other retention mechanism, such as fasteners.

The pressure differential also urges the O-rings 78 and the terminals 50 toward the outer side 22, thereby further retaining the O-rings 78 and the terminals 50 in the terminal bores 46 and 48. Again, depending on the degree of the pressure differential as well as the construction and relative position of the terminals 50, seals 78 and insulators 66, the pressure differential may or may not actually cause movement of the terminals 50 and/or seals 78. As a result, the arrangement 14 may be provided without a cover or other structure positioned over the terminal bores 46 and 48. Alternatively, the arrangement 14 may be provided with a cover, such as a perforated cover, positioned over the terminal bores 46 and 48. Furthermore, the pressure differential may also compress the O-rings 78, thereby further sealing the terminal bores 46 and 48.

Because the terminal bores 46 and 48 are canted with respect to the sleeve axis 32, the size of the sleeve 30 can be minimized while still providing sufficient space for the insulators 66 and the O-rings 78. If additional electrically conductive members such as wires are required for a particular application, then the sleeve 30 may be provided with one or more additional terminal channels or bores for receiving one or more additional terminals. Such additional terminal bores would also preferably be canted with respect to the sleeve axis 32, so as to provide sufficient space for additional insulators and O-rings.

While the best mode for carrying out the invention has been described in detail, those familiar with the art to which this invention relates will recognize various alternative designs and embodiments for practicing the invention as defined by the following claims.

What is claimed:

1. An arrangement for passing an electrical signal between a first area having a first pressure, and a second area having a second pressure, wherein the first pressure is normally greater than the second pressure, the arrangement comprising:
    a body disposable between the first and second areas, the body having a first surface disposable adjacent the first area, and an aperture extending from the first surface;
    a sleeve non-threadingly engaged with the body and defining a passage, the sleeve further having a first portion disposed adjacent the first surface, and a second portion disposed in the aperture; and
    an electrically conductive element disposed at least partially in the passage;
    wherein when the sleeve is exposed to the first pressure, the first portion is urged toward the first surface of the body.

2. The arrangement of claim 1 further comprising a first conductive member in electrical communication with the conductive element and adapted to extend into the first area, and a second conductive member in electrical communication with the conductive element and adapted to extend into the second area.

3. The arrangement of claim 1 wherein the passage includes a main channel and a first conductive element channel extending from the main channel, and wherein the conductive element is disposed at least partially in the first conductive element channel.

4. The arrangement of claim 1 wherein the sleeve further comprises a second conductive element channel extending from the main channel, and the arrangement further comprises an additional conductive element disposed at least partially in the second conductive element channel.

5. The arrangement of claim 4 wherein the sleeve has a sleeve axis, and the conductive element channels are canted with respect to the sleeve axis.

6. An arrangement for passing an electrical signal between a first area having a first pressure, and a second area having a second pressure, wherein the first pressure is normally greater than the second pressure, the arrangement comprising:
    a body disposable between the first and second areas, the body having a first surface disposable adjacent the first area, and an aperture extending from the first surface;
    a sleeve non-threadingly engaged with the body and defining a passage, the sleeve further having a first portion disposed adjacent the first surface, and a second portion disposed in the aperture; and
    a terminal having a radially extending projection and first and second shank sections extending from the projection, and the arrangement further comprises an insulator disposed between the terminal and the sleeve, the insulator having a main portion and first and second annular portions extending from the main portion, the first annular portion extending between the projection and the sleeve, and the main portion and the second annular portion extending between the second shank section and the sleeve,
    wherein when the sleeve is exposed to the first pressure, the first portion is urged toward the first surface of the body.

7. The arrangement of claim 6 further comprising a seal disposed between the first shank section and the sleeve.

8. An arrangement for passing an electrical signal between first and second areas, the arrangement comprising:
- a body disposable between the first and second areas and having an aperture;
- a sleeve disposed at least partially in the aperture, the sleeve having a sleeve axis, a main channel and first and second terminal channels extending from the main channel, the terminal channels being canted with respect to the sleeve axis;
- a first terminal disposed at least partially in the first terminal channel; and
- a second terminal disposed at least partially in the second terminal channel.

9. The arrangement of claim 8 further comprising a first conductive member in electrical communication with the first terminal and adapted to extend into the first area, a second conductive member in electrical communication with the first terminal and adapted to extend into the second area, a third conductive member in electrical communication with the second terminal and adapted to extend into the first area, and a fourth conductive member in electrical communication with the second terminal and adapted to extend into the second area.

10. The arrangement of claim 8 wherein the body further has a first surface disposable adjacent the first area, and wherein the sleeve is non-threadingly engaged with the body and includes a first portion disposed adjacent the first surface, and a second portion disposed in the aperture.

11. The arrangement of claim 8 wherein each terminal has a radially extending projection and first and second shank sections extending from the projection, and the arrangement further comprises first and second insulators respectively disposed in the first and second terminal channels, each insulator having a main portion and first and second annular portions extending from the main portion, each first annular portion extending between a respective projection and the sleeve, and each main portion and each second annular portion extending between a respective second shank section and the sleeve.

12. The arrangement of claim 11 further comprising first and second seals respectively disposed in the first and second terminal channels, each seal being disposed between a respective first shank section and the sleeve.

13. An arrangement for permitting transmission of an electrical signal between a first area having a first pressure and a second area having a second pressure, wherein the first pressure is normally greater than the second pressure such that a pressure differential is created between the areas, the arrangement comprising:
- a body disposable between the first and second areas, the body having a first surface disposable adjacent the first area, and a passage extending from the first surface;
- a sleeve non-threadingly engaged with the body and being urged into a retaining relationship with the body by the pressure differential when the sleeve is exposed to the pressure differential, the sleeve having a sleeve axis, a first portion disposed adjacent the first surface, and a second portion disposed in the passage, the sleeve further having a main bore and first and second terminal bores extending from the main bore, the terminal bores being canted with respect to the sleeve 21 axis;
- first and second terminals, the first terminal being disposed at least partially in the first terminal bore, and the second terminal being disposed at least partially in the second terminal bore; and
- first and second insulators, the first insulator being disposed between the first terminal and the sleeve, and the second insulator being disposed between the second insulator and the sleeve.

14. A system for passing an electrical signal between areas, the system comprising:
- a housing defining a first area having a first pressure and a second area having a second pressure, wherein the first pressure is normally greater than the second pressure;
- a body engaged with the housing and disposed between the first and second areas, the body having a first surface disposed adjacent the first area, and an aperture extending from the first surface;
- a sleeve non-threadingly engaged with the body and defining a passage, the sleeve further having a first portion disposed adjacent the first surface, and a second portion disposed in the aperture; and
- an electrically conductive element disposed at least partially in the passage;
- wherein when the sleeve is exposed to the first pressure, the first portion is urged toward the first surface of the body.

15. The system of claim 14 further comprising a first conductive member in electrical communication with the conductive element and extending into the first area, and a second conductive member in electrical communication with the conductive element and extending into the second area.

16. The system of claim 14 wherein the passage includes a main channel and a first conductive element channel extending from the main channel, and wherein the conductive element is disposed at least partially in the first conductive element channel.

17. The system of claim 14 wherein the sleeve further comprises a second conductive element channel extending from the main channel, and the system further comprises an additional conductive element disposed at least partially in the second conductive element channel.

18. The system of claim 17 wherein the sleeve has a sleeve axis, and the conductive element channels are canted with respect to the sleeve axis.

19. A system for passing an electrical signal between areas, the system comprising:
- a housing defining a first area having a first pressure and a second area having a second pressure, wherein the first pressure is normally greater than the second pressure;
- a body engaged with the housing and disposed between the first and second areas, the body having a first surface disposed adjacent the first area, and an aperture extending from the first surface;
- a sleeve non-threadingly engaged with the body and defining a passage, the sleeve further having a first portion disposed adjacent the first surface, and a second portion disposed in the aperture; and
- a terminal having a radially extending projection and first and second shank sections extending from the projection, and the system further comprises an insulator disposed between the terminal and the sleeve, the insulator having a main portion and first and second annular portions extending from the main portion, the first annular portion extending between the projection and the sleeve, and the main portion and the second annular portion extending between the second shank section and the sleeve,
- wherein when the sleeve is exposed to the first pressure, the first portion is urged toward the first surface of the body.

20. The system of claim 19 further comprising a seal disposed between the first shank section and the sleeve.

21. A system for passing an electrical signal between areas, the system comprising:

a housing defining first and second areas;

a body engaged with the housing and having an aperture disposed between the areas;

a sleeve disposed at least partially in the aperture, the sleeve having a longitudinal sleeve axis, a main channel and first and second terminal channels extending from the main channel, the terminal channels being canted with respect to the sleeve axis;

a first terminal disposed at least partially in the first terminal channel; and a second terminal disposed at least partially in the second terminal channel.

22. The system of claim 21 further comprising a first conductive member in electrical communication with the first terminal and extending into the first area, a second conductive member in electrical communication with the first terminal and extending into the second area, a third conductive member in electrical communication with the second terminal and extending into the first area, and a fourth conductive member in electrical communication with the second terminal and extending into the second area.

23. The system of claim 21 wherein the body further has a first surface disposed adjacent the first area, and wherein the sleeve is non-threadingly engaged with the body and includes a first portion disposed adjacent the first surface, and a second portion disposed in the aperture.

24. The system of claim 21 wherein each terminal has a radially extending projection and first and second shank sections extending from the projection, and the system further comprises first and second insulators respectively disposed in the first and second terminal channels, each insulator having a main portion and first and second annular portions extending from the main portion, each first annular portion extending between a respective projection and the sleeve, and each main portion and each second annular portion extending between a respective second shank section and the sleeve.

25. The system of claim 24 further comprising first and second seals respectively disposed in the first and second terminal channels, each seal being disposed between a respective first shank section and the sleeve.

* * * * *